United States Patent Office.

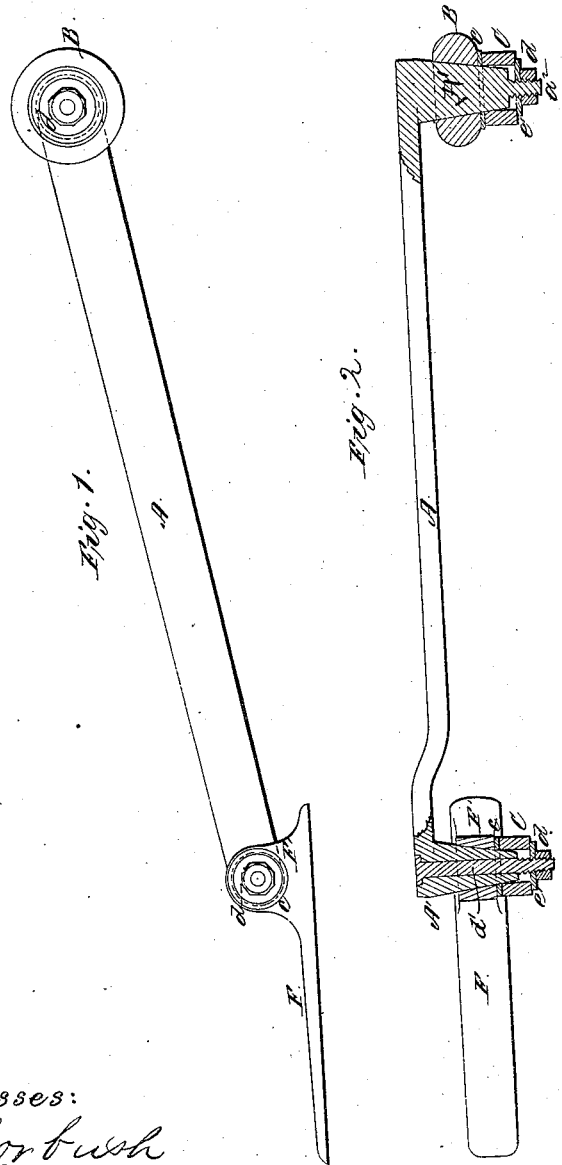

GEORGE L. SQUIER, OF BUFFALO, NEW YORK.

Letters Patent No. 68,581, dated September 3, 1867.

---

IMPROVEMENT IN HARVESTER-PITMEN.

---

The Schedule referred to in these Letters Patent and making part of the same.

---

TO ALL WHOM IT MAY CONCERN:

Be it known that I, GEORGE L. SQUIER, of the city of Buffalo, county of Erie, and State of New York, have invented a new and improved Connecting-Rod for Mowing Machines; and I do hereby declare that the following is a full and exact description thereof, reference being had to the accompanying drawings, making a part of this specification, in which—

Figure I is a front elevation, and
Figure II is a sectional elevation of the same.

The nature of this invention consists in the application and use of a compensating rubber or spiral spring upon a conical wrist-pin of a connecting-rod, such pin being compressed and held by a nut on the end of the wrist-pin.

Letters of like name and kind refer to like parts in each of the figures.

A represents a connecting-rod of a mowing machine, having upon each end a conical wrist-pin, A'. B represents a portion of the crank-wheel, or the end of a crank, through which one of the conical wrist-pins is passed for the purpose of forming a journal-bearing connection therewith, the bearing in the crank or crank-wheel being made in a conical form, corresponding to the conical form of the journal or wrist-pin. C represents a rubber or spiral spring. This is placed upon the end of the conical wrist-pin after the pin is put through the eye or journal-bearing of the crank or cutter-bar, and is compressed and held in place by the screw-nut $d$. A screw-thread may be cut upon the end of the wrist-pin for that purpose, as shown at $a^2$; or a separate bolt may be passed through a hole bored lengthwise through the pin, as shown at $d'$. Metal washers $e$ $e'$ are interposed between the rubber spring and the screw-nut $d$, and between the spring and crank and eye of the cutter-bar. F represents the heel end of the cutter-bar, and F' the socket or journal-bearing formed therein, which conforms in size and shape to the conical wrist-pin, and is connected to the wrist-pin upon that end of the connecting-rod, in the manner described.

*Operation.*

The rapid motion to which the connecting-rods of reaping and mowing machines are subjected, and the great labor they are required to perform, causes a rapid wearing away of these connections; and in a short time they wear loose, and "pound" and impede the complete operation of the cutters, and hence it becomes necessary to contrive some device which will compensate for this constant wearing, and keep the bearings perfect. Conical bearings have been and are now used on the connecting-rods of these machines; but these have no self-acting compensating device, and consequently require the constant attention of the driver or attendant of the machine to tighten up the bearings from time to time, as he may deem it necessary; but often, through inadvertence, these bearings are allowed to work loose and pound, and the machine and the work thereby damaged. My improvement obviates these difficulties by furnishing a self-acting compensating device, which will follow up the wearing away of these bearings, and prevent them from working loose. The spring has a direct action upon these conical bearings, and has sufficient expansive power to draw the one into the other as fast as there is any wearing away; and hence the bearings are kept perfect, and there is no liability to accident or damage arising from the wearing away of these bearings, or the inattention of the driver.

What I claim as my invention, and desire to secure by Letters Patent, is—

The connecting-rod A, provided with a conical wrist-pin, A', in combination with a compensating rubber or spiral spring, C, and screw-nut $d$, for the purpose and substantially as described.

GEO. L. SQUIER.

Witnesses:
E. B. FORBUSH,
B. H. MUEHLE.